C. J. PEMBROKE.
VEHICLE FRAME.
APPLICATION FILED APR. 5, 1906.
1,071,335.
Patented Aug. 26, 1913.
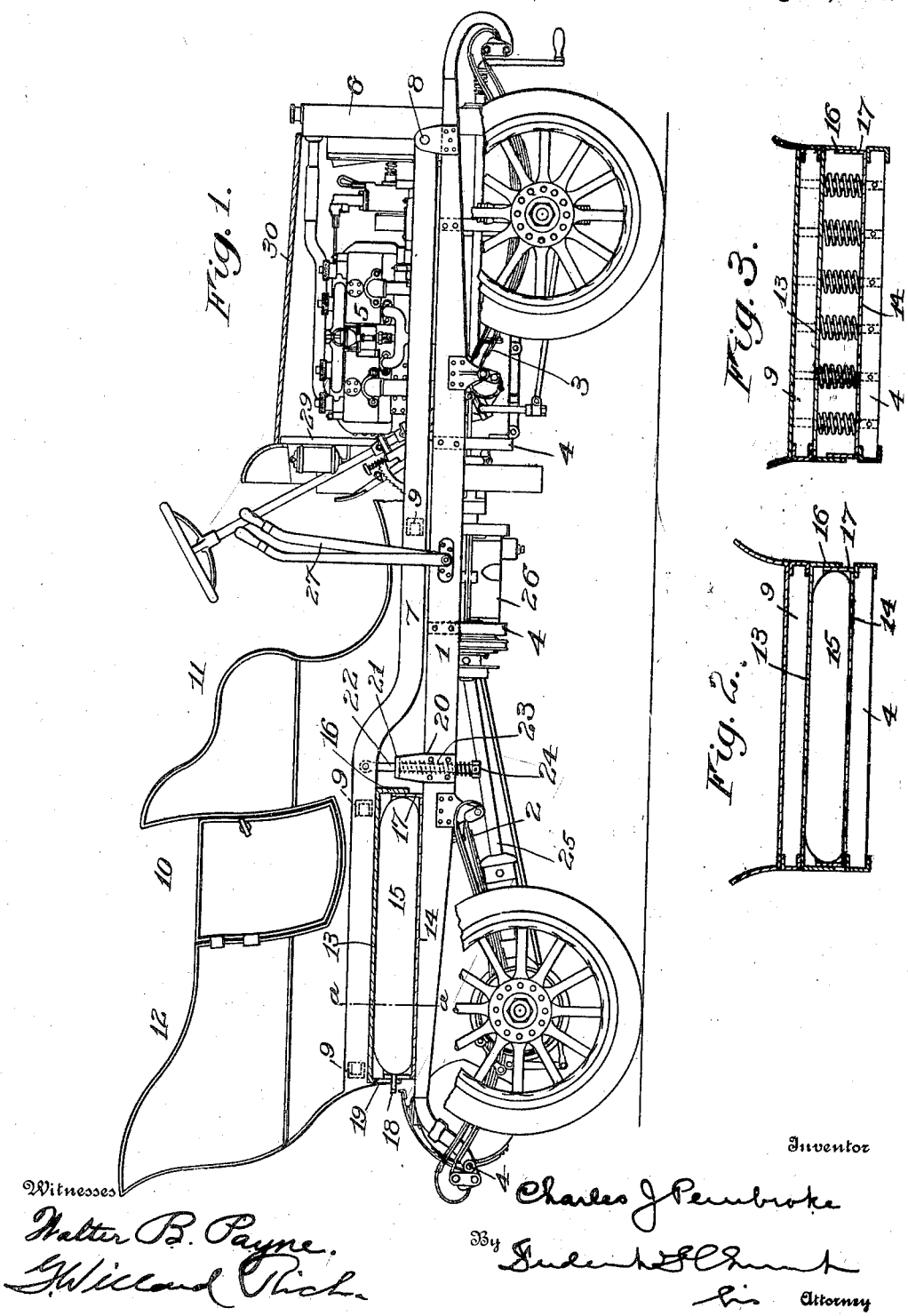

UNITED STATES PATENT OFFICE.

CHARLES J. PEMBROKE, OF ROCHESTER, NEW YORK.

VEHICLE-FRAME.

1,071,335. Specification of Letters Patent. Patented Aug. 26, 1913.

Application filed April 5, 1906. Serial No. 310,035.

*To all whom it may concern:*

Be it known that I, CHARLES J. PEMBROKE, of Rochester, in the county of Monroe and State of New York, have invented certain new and useful Improvements in Vehicle-Frames; and I do hereby declare the following to be a full, clear, and exact description of the same, reference being had to the accompanying drawings, forming a part of the specification, and to the reference-numerals marked thereon.

My present invention relates to vehicles and it has for its object to provide an improved frame for supporting the body of the vehicle which is adapted to relieve the shock received when one or another of its wheels engage obstructions or inequalities in a road bed.

To these and other ends the invention consists in certain improvements and combinations of parts all as will be hereinafter more fully described, the novel features being pointed out in the claims at the end of the specification.

In the drawings: Figure 1 is a side elevation of a motor car illustrating a vehicle frame constructed in accordance with my invention, parts thereof being shown in section to reveal particular details of construction. Fig. 2 is a detail section, substantially on the line *a—a* of Fig. 1, showing the cushion employed and adjacent parts. Fig. 3 is a similar view illustrating a modification.

Similar reference numerals in the several figures indicate similar parts.

A vehicle frame embodying my invention comprises generally a main portion or frame on which is mounted a movable supplemental frame resting on a resilient support and connected to the main frame in such a manner that it is capable of independent vertical movement thereon.

In illustrating my invention I have shown it applied to a motor car or automobile, which for present purposes of illustration is of conventional design, so far as here included and consists of a main frame embodying side sills 1 supported at their opposite ends upon the springs 2 and 3 connected to the forward and rear axles and connected by suitable cross bars or braces 4. The main frame carries the engine 5, radiator 6 and the various connected parts. In adapting my invention to a vehicle of this character I superpose on the main frame a supplemental frame comprising the side sills 7 extending longitudinally of the sills 1 and pivoted at their forward ends to upwardly extending brackets 8 thereon. These sills are also connected by cross bars or braces 9, arranged at suitable points as indicated by dotted lines in Fig. 1, and support the body 10 in which are the passengers' seats 11 and 12. At their rear ends the sills of the supplemental frame are offset upwardly as shown, away from the main frame and are provided at their lower sides with suitable flooring 13 arranged above a similar flooring 14, extending transversely of the main frame and supported on the upper edges of the sills 1. Interposed between the two frames at this point is a cushioning device which in the present illustration I have shown in the form of a pneumatic cushion 15 inclosed within a casing formed by the telescoping flanges or walls 16 and 17 at the edges of the floors 13 and 14 respectively. This cushion may be inflated before insertion or be provided with a valve 18, located in alinement with registering notches 19 provided in the flanges or side walls 16 and 17, and adapted for the attachment of pumping devices whereby the resiliency of the cushion to support the weight of the body and the load carried therein so that the supplemental frame will at all times be held out of contact with the main frame. Suitable springs may be used in lieu of the pneumatic cushion, as shown in Fig. 3, or a plurality of such cushions employed, as will be understood.

The cushioning devices located between the main and supplemental frames operate to relieve the jar received by the main frame, by the impact of one of its wheels with an obstruction, or depression in a road bed, and prevents a relative movement of the main frame to the supplemental frame, and if the shock is severe enough to impart an upward movement to the supplemental frame its return will be slowly checked by the cushioning devices. The supplemental frame is attached at its forward end to the main frame of the vehicle by its pivotal connections with the brackets 8 and its rear end is guided and held in alinement with the main frame by suitable guides which are provided with stops to limit the separating movement of the two frames. These guides are located at each side of the vehicle and in the present instance each comprises a bracket 20 attached, to the main frame, having a laterally extending perforated end 21 in which is guided a vertically movable rod 22 pivoted to the supplemental frame. The lower end of the rod is surrounded by a coil spring 23 held in place by a nut 24 which may be adjusted to vary the tension of the spring and control the upward movement of the supplemental frame.

In applying my invention to a motor car or automobile I prefer to support the engine 5 and its connected parts, such as the radiator 6 and the driving devices 25, the variable speed mechanism 26 and the controlling levers 27 on the main frame. And to also mount thereon the steering head 28 and the dash 29, but the bonnet or hood 30, inclosing the engine may be mounted on the supplemental frame for as it is located at the forward end thereof the movement imparted thereto will be slight. This arrangement of the parts prevents the vibration caused by the pulsations of the engine from being transferred to the body 10 of the vehicle to the discomfiture of the passengers.

A vehicle frame constructed in accordance with my invention is particularly adapted to be used with self propelled vehicles and the simplicity of its construction enables it to be applied to motor cars or automobiles heretofore constructed, although I do not consider my invention limited to this adaptation. However, when my invention is applied to vehicles of this character it contributes to the comfort of the passengers by relieving the sudden jars and as it yieldingly supports the weight carried in the body, the strain on the tires of the wheels is greatly reduced.

I claim as my invention:

1. In a motor vehicle, the combination with a running gear comprising the front and rear pairs of wheels, axles connecting them and the main frame having side sills and located above and yieldingly supported at its ends upon the forward and rear axles, of the engine mounted on the forward ends of the sills of the main frame, a supplemental frame superposed on the main frame having side sills of a length substantially coextensive with that of the main frame sills and having their forward ends extending along the forward ends of the main frame sills to a point beyond the engine, pivotal connections between the forward ends of the sills of the two frames, a seat body mounted on the rear end of the supplemental frame and an engine hood also supported on the forward end of said frame, and means for yieldingly supporting the supplemental frame on the main frame and permitting it to move relatively thereto.

2. In a motor vehicle, the combination with the running gear comprising the main frame having side sills and the engine mounted on the forward ends of said side sills, of a supplemental body-supporting and engine-hood carrying frame having side sills approximately coextensive in length with that of the side sills and arranged above and parallel to the latter, the forward ends of the sills of the supplemental frame lying in juxtaposition to the main frame and pivoted thereto at a point forward of the engine and the opposite ends of the supplemental frame sills extending upwardly and rearwardly to form a space between them and the main frame and means for yieldingly supporting the supplemental frame arranged in said space.

CHARLES J. PEMBROKE.

Witnesses:
G. WILLARD RICH,
FLORENCE E. FRANCK.